(12) United States Patent
Yi et al.

(10) Patent No.: US 9,218,473 B2
(45) Date of Patent: Dec. 22, 2015

(54) CREATION AND AUTHENTICATION OF BIOMETRIC INFORMATION

(71) Applicant: SUPREMA INC., Seongnam-si (KR)

(72) Inventors: Jinwook Yi, Seongnam-si (KR); Bong Seop Song, Seongnam-si (KR); Jae Won Lee, Seongnam-si (KR)

(73) Assignee: SUPREMA INC., Gyeonggi-Do (KR)

( * ) Notice: Subject to any disclaimer, the term of this patent is extended or adjusted under 35 U.S.C. 154(b) by 189 days.

(21) Appl. No.: 14/139,874

(22) Filed: Dec. 24, 2013

(65) Prior Publication Data

US 2015/0026479 A1  Jan. 22, 2015

(30) Foreign Application Priority Data

Jul. 18, 2013 (KR) .................. 10-2013-0085018
Sep. 12, 2013 (KR) .................. 10-2013-0109601

(51) Int. Cl.
*G06F 21/32* (2013.01)

(52) U.S. Cl.
CPC .................................... *G06F 21/32* (2013.01)

(58) Field of Classification Search
CPC ........................................................ G06F 21/32
USPC ................................................................ 713/182
See application file for complete search history.

(56) References Cited

U.S. PATENT DOCUMENTS

| | | | | |
|---|---|---|---|---|
| 6,370,629 B1 * | 4/2002 | Hastings | ............. | G06F 21/6218 711/153 |
| 6,553,494 B1 * | 4/2003 | Glass | .................... | G06F 21/32 713/176 |
| 6,668,322 B1 * | 12/2003 | Wood | .................... | G06F 21/41 713/182 |
| 6,751,734 B1 * | 6/2004 | Uchida | .................... | G06F 21/32 713/168 |
| 7,035,442 B2 | 4/2006 | Ha et al. | | |
| 7,085,931 B1 * | 8/2006 | Smith | .................... | G06F 21/335 713/175 |
| 7,114,080 B2 * | 9/2006 | Rahman | ............. | H04L 63/0861 382/115 |
| 7,409,543 B1 * | 8/2008 | Bjorn | .................... | H04L 9/0825 380/255 |
| 7,481,364 B2 * | 1/2009 | Cannon | ............... | G06K 7/0008 235/380 |
| 8,090,162 B2 * | 1/2012 | Harris | .................... | G06K 9/00 348/302 |
| 8,184,872 B2 | 5/2012 | Lu et al. | | |
| 8,472,680 B2 | 6/2013 | Choi et al. | | |
| 8,621,209 B1 * | 12/2013 | Johansson | ............... | H04L 63/08 713/155 |

(Continued)

FOREIGN PATENT DOCUMENTS

| EP | 2 579 221 A1 | 4/2013 | | |
|---|---|---|---|---|
| EP | 2579221 A1 * | 4/2013 | ............. | G06F 21/32 |

(Continued)

OTHER PUBLICATIONS

Haller et al., "On Internet Authentication", RFC 1704, 1994.*

(Continued)

*Primary Examiner* — O. C. Vostal
(74) *Attorney, Agent, or Firm* — Ladas & Parry, LLP (57) ABSTRACT

In accordance with the embodiments of the present invention, the biometric information created for biometric authentication is available for a predetermined time after it was acquired. In addition, the authentication processing is performed on the biometric information useful for a predetermined time after the biometric information was acquired when authenticating it. Therefore, the authentication processing can be normally performed on only the biometric information that is acquired immediately when it is necessary for the user to do the financial transaction or individual authentication.

17 Claims, 5 Drawing Sheets

(56) References Cited

U.S. PATENT DOCUMENTS

| | | | |
|---|---|---|---|
| 8,745,406 B2* | 6/2014 | King | G06F 21/125 713/164 |
| 2002/0124176 A1* | 9/2002 | Epstein | G06Q 20/341 713/186 |
| 2002/0144128 A1* | 10/2002 | Rahman | H04L 63/0861 713/186 |
| 2003/0152254 A1 | 8/2003 | Ha et al. | |
| 2005/0210269 A1* | 9/2005 | Tiberg | H04L 9/3231 713/186 |
| 2007/0130472 A1* | 6/2007 | Buer | H04L 63/0428 713/182 |
| 2009/0125997 A1* | 5/2009 | Cook | G06F 21/34 726/6 |
| 2009/0313687 A1* | 12/2009 | Popp | H04L 9/3228 726/9 |
| 2010/0241571 A1* | 9/2010 | McDonald | G06Q 20/12 705/74 |
| 2011/0264919 A1* | 10/2011 | Pizano | H04L 9/0866 713/186 |
| 2012/0188104 A1* | 7/2012 | Choi | G06Q 10/083 340/989 |
| 2012/0204245 A1* | 8/2012 | Ting | G06F 21/35 726/6 |
| 2013/0145449 A1* | 6/2013 | Busser | G06F 21/31 726/7 |
| 2013/0276078 A1* | 10/2013 | Rockwell | G06F 21/43 726/7 |
| 2014/0282935 A1* | 9/2014 | Lal | G06F 21/72 726/6 |

FOREIGN PATENT DOCUMENTS

| | | | |
|---|---|---|---|
| KR | 10-0353731 | 9/2002 | |
| KR | 10-2013-0009356 | 1/2013 | |
| KR | 10-1226151 | 1/2013 | |
| KR | 10-2013-0028327 | 3/2013 | |
| SE | CA 2491059 A1 * | 1/2004 | H04L 9/3231 |
| WO | WO 2004084482 A1 * | 9/2004 | H04L 9/3231 |

OTHER PUBLICATIONS

Haller, "The S/KEY One-Time Password System", RFC 1760, 1995.*

Office Action dated May 29, 2014 for corresponding Korean Patent Application No. 10-2013-0109601 and its English summary provided by Applicant's foreign counsel.

* cited by examiner

CREATION AND AUTHENTICATION OF BIOMETRIC INFORMATION

RELATED APPLICATIONS

This application claims the benefit of Korean Patent Application Nos. 10-2013-0085018, filed on Jul. 18, 2013 and 10-2013-0109601, filed on Sep. 12, 2013, which is hereby included by reference as if fully set forth herein.

FIELD OF THE INVENTION

The present invention relates to the creation and authentication of biometric information, and more particularly, to an apparatus and method for creating biometric information available for a predetermined time, an apparatus and method for authenticating biometric information available for the predetermined time, and a system for creating and authenticating biometric information using the same.

BACKGROUND OF THE INVENTION

Typically, due to the development of information technology and the Internet, the size of the industry related to online e-commerce and identification increases and the demand for accurate authentication of individuals grows. Accordingly, an existing authentication method using a PIN (Personal Identification Number) or password has reached its maximum limit.

On the other hand, user authentication using biometrics is not only convenient to use and but also commercially available because of its security and economics. The user authentication using biometrics is used mainly in embedded systems such as an ATM (Automated Teller Machine) or personal computers, but is expanding its use up to mobile devices in recent years by the development of technology.

The most prominent feature of biometric information inclusive of a fingerprint is that it has unique advantages that there is no risk of forgetting passwords and that the biometric authentication cannot be achieved unless a relevant person is involved in the biometric authentication.

However, since this biometric information is converted into digital data and is then used in a personal computer, a handheld device, a server, or the like, malicious leakage and collection of the biometric information may cause severe problems different from the outflow of the password.

While a user can arbitrarily change his/her password if it is leaked, the user may not use his/her biometric information for a lifetime if it is leaked. As an example, if data for the index finger/middle finger of the right hand that has been already registered as biometric information of the user is leaked, the user may have to use other fingers to provide his/her biometric information since then. However, there may be a possibility that data of the other fingers is also leaked and furthermore there is a limit to the number of human fingers, which leads to many constraints. Since other biometric information such as the face, finger vein and the like also has a unique value for individual, when it is leaked out once, it may result in fatal consequences.

Furthermore, the crucial feature of the biometric information is the fact that the data relevant to the biometric information changes little by little each time the data is acquired. Thus, since the biometric authentication has a principle to use the similarity of the biometric information registered in advance, biometric information that is newly acquired for biometric authentication may not be 100% consistent with the biometric information registered in advance when comparing them, which makes it difficult to apply the advanced encryption algorithm to the biometric authentication.

In order to avoid this shortcoming, a widely used method is to either encrypt information related to the biometric information and then send the encrypted biometric information, or employ a permanent deformation from which an inverse conversion cannot be achieved by using a fuzzy vault.

However, even though the data is encrypted or modified, if the data is leaked once, attempt to authenticate falsely can be made at any time later with leaked data. Therefore, the aforementioned method may not be a fundamental solution.

In addition, in order to turn the individual authentication using the biometrics into the authentication measurement with high security even in the personal computers and handheld devices beyond the area of existing access control or time attendance, it is necessary to verify that the biometric information under consideration is the biometric information that is acquired immediately when requiring the biometric authentication and is distinct biometric information of a relevant person. This is because while a typical authentication system based on the biometrics in public places is provided with an additional equipment such as a CCTV (Closed Circuit Television), etc. which is capable of monitoring the situation that a relevant person enters his/her biometric information, personal computers or handheld devices can do hacking/cracking works without any restriction in a secret place.

Accordingly, if the underlying problems like this do not be solved, installing the biometric authentication capability on a personal device such as a handheld device mobile device may cause very dangerous problems.

SUMMARY OF THE INVENTION

In view of the above, the present invention provides an apparatus and method of creating biometric information for authentication that is available for a predetermined time after it was acquired.

Further, the present invention provides an apparatus and method of authenticating biometric information for authentication that is available for a predetermined time after it was acquired.

Further, the present invention provides a system for creating and authenticating biometric information which integrates an apparatus for creating biometric information for authentication that is available for a predetermined time after it was acquired and an apparatus for authenticating the biometric information for authentication.

In accordance with a first aspect of the exemplary embodiment of the present invention, there is provided an apparatus for creating biometric information, the apparatus includes: a biometric information encryption module configured to encrypt biometric image information using a one-time password that is available for a predetermined time to create one-time biometric information that can be decrypted using the one-time password within the predetermined time; an authentication information producing unit configured to produce biometric information for authentication in which the one-time biometric information and unique identification information for the decryption are included; and a data interface unit configured to present an interface through which the biometric information for authentication is outputted in order to carry out an authentication procedure.

Further, the biometric information encryption module is configured to encrypt feature information that is extracted from the biometric image information to create the one-time biometric information, and wherein the authentication information producing unit is configured to process the biometric information for authentication into a template form with a particular format.

Further, the biometric information encryption module is configured to generate the one-time password through an algorithm that utilizes a current time value and a unique secret key as a seed value.

Further, the biometric information encryption module is configured to verify whether the biometric image information is faked or falsified and determines whether the biometric image information has a usefulness enough to use in the authentication before carrying out the encryption.

In accordance with a second aspect of the exemplary embodiment of the present invention, there is provided a method for creating biometric information, the method includes: generating a one-time password that is available for a predetermined time; creating one-time biometric information by encrypting biometric image information using the one-time password, wherein the one-time biometric information can be decrypted using the one-time password within the predetermined time; and producing biometric information for authentication in which the one-time biometric information and unique identification information for the decryption are included to output the same.

Further, said creating the one-time biometric information comprises encrypting feature information that is extracted from the biometric image information to thereby create the one-time biometric information, and wherein said producing bio metric information for authentication comprises processing the biometric information for authentication into a template form with a particular format.

Further, the one-time password is generated through an algorithm that utilizes a current time value and a unique secret key as a seed value.

Further, said creating one-time biometric information comprises verifying whether the biometric image information is faked or falsified and determining whether the biometric image information has a usefulness enough to use in the authentication before carrying out the encryption.

In accordance with a third aspect of the exemplary embodiment of the present invention, there is provided an apparatus for creating biometric information, the apparatus includes: a data communication unit configured to receive biometric information for authentication including a one-time biometric information that can be decrypted by using a one-time password that is available for a predetermined time; an OTP (one-time password) acquiring unit configured to acquire the one-time password employed during an encryption process using unique identification information which is included in the biometric information for authentication; a biometric information decryption unit configured to decrypt the one-time biometric information using the one-time password to extract biometric image information; a biometric information storage unit that stores a reference biometric information to be utilized in an authentication procedure; a biometric authentication unit configured to authenticate the biometric image information based on the result of comparison between the biometric image information and the reference biometric information; and an authentication result output unit configured to output the result that is authenticated by the biometric authentication unit.

Further, the biometric authentication unit is configured to process feature information that is extracted from the biometric image information in a template form with a particular format to produce a biometric information template before authenticating the biometric image information based on the result of a comparison between the biometric image information and the reference biometric information.

Further, the one-time password is generated by an algorithm that utilizes a secret key corresponding to the unique identification information and a current time value as a seed value.

Further, the OTP acquiring unit is further configured to send the unique identification information to a one-time password server on which the algorithm is installed to generate the one-time password and then receive the one-time password from the one-time password server.

In accordance with a fourth aspect of the exemplary embodiment of the present invention, there is provided a method for authenticating biometric information, the method includes: receiving biometric information for authentication including one-time biometric information that can be decrypted by using a one-time password that is available for a predetermined time; acquiring the one-time password employed during an encryption process using unique identification information that is included in the biometric information for authentication; decrypting the one-time biometric information using the one-time password to extract biometric image information; and outputting the result that authenticates the biometric image information based on the result of a comparison between the biometric image information and predetermined reference biometric information.

Further, said outputting the result that authenticates the biometric image information comprises processing feature information that is extracted from the biometric image information in a template form with a particular format to produce a biometric information template before authenticating the biometric image information based on the result of a comparison between the biometric image information and the reference biometric information.

Further, the one-time password is generated by an algorithm that utilizes a secret key corresponding to the unique identification information and a current time value as a seed value.

Further, said acquiring the one-time password further comprises sending the unique identification information to a one-time password server on which the algorithm is installed to produce the one-time password and receiving the one-time password from the one-time password server.

In accordance with a fifth aspect of the exemplary embodiment of the present invention, there is provided a system for creating and authenticating biometric information, the system includes: a biometric information creating apparatus configured to: encrypt biometric image information using a one-time password that is available for a predetermined time to create one-time biometric information that can be decrypted using the one-time password within the predetermined time; and output biometric information for authentication in which the one-time password and unique identification information for the decryption; and a biometric information authenticating apparatus configured to: acquire the one-time password employed during an encryption process using the unique identification information that is included in the biometric information for authentication; decrypt the one-time biometric information using the one-time password to extract biometric image information; and output the result that authenticates the biometric image information based on the result of a comparison between the biometric image information and the reference biometric information.

In accordance with the embodiments of the present invention, the biometric information created for biometric authentication is available for a predetermined time after it was acquired. In addition, the authentication processing is performed on the biometric information useful for a predetermined time after the biometric information was acquired when authenticating it. Therefore, the authentication processing can be normally performed on only the biometric information that is acquired immediately when it is necessary for the user to do the financial transaction or individual authentication.

Further, the biometric image information for a biometric authentication is encrypted immediately after it was acquired and can be decrypted only for a predetermined time. Therefore, even if the relevant biometric information is leaked, the leaked biometric information will be useless information which cannot pass the biometric authentication when the predetermined time has lapsed.

Consequently, it is possible to provide a high security since biometric data cannot be changed even if a biometric authentication device that creates biometric information for authentication is modified by its manufacturer, as well as a personal computer or a mobile device is modified in its software or application that transmits biometric information for authentication.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Embodiments of the present invention will be described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Figure 1:
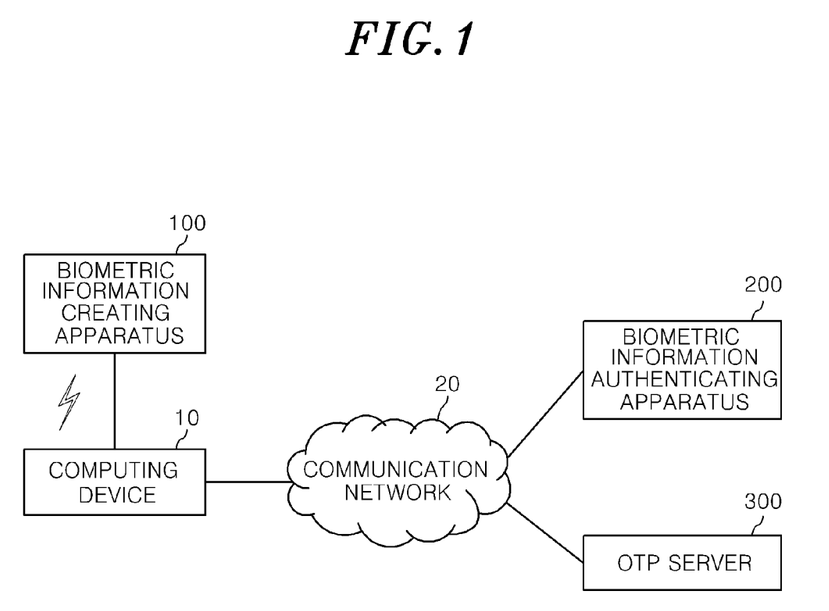
FIG. 1 is a network configuration diagram of a system for creating and authenticating biometric information in accordance with an embodiment of the present invention.

FIG. 1 is a network configuration diagram of a system for creating and authenticating biometric information in accordance with an embodiment of the present invention.

As illustrated in the drawing, a system for creating and authentication biometric information includes a biometric information creating apparatus 100, a biometric information authenticating apparatus 200, and a one-time password (OTP) server 300. The biometric information creating apparatus 100 may have a wired/wireless connectivity with a computing device 10. All of the computing device 10, the biometric information authenticating apparatus 200 and the OTP server 300 may be connected each other via a communication network 20.

The biometric information creating apparatus 100 encrypts biometric image information using a one-time password that is available for a predetermined time and creates one-time biometric information that can be decrypted using the one-time password within the predetermined time. Further, the biometric information creating apparatus 100 outputs a biometric information for authentication in which the one-time biometric information and unique identification information for decryption are included. In other words, the biometric information creating apparatus 100 may encrypt feature information extracted from the biometric image information to produce the one-time biometric information and may process the biometric information for authentication in the form of a template with a particular format.

This biometric information creating apparatus 100 may include a biometric image acquiring unit as one body to acquire the biometric image information such as a fingerprint image or face image of a user so that the biometric image information can be acquired directly. Alternatively, the biometric information creating apparatus 100 may receive the biometric image information from an external biometric image acquiring unit that is connected thereto. Details of the biometric information creating apparatus 100 will be described with reference to FIG. 2 below.

The biometric information authenticating apparatus 200 obtains the one-time password employed during the encryption process through the use of the unique identification information, which is included in the biometric information for authentication, outputted from the biometric information creating apparatus 100, decrypts the one-time biometric information using the one-time password to extract the biometric image information, and outputs the result of the authentication processing based on the comparison between the biometric image information and a predetermined reference biometric information. As an example, the biometric information authenticating apparatus 200 may process the feature information extracted from the biometric image information in a template form with a particular format to produce a biometric information template and then authenticates the biometric image information by comparing the biometric information template with the predetermined reference biometric information.

This biometric information authenticating apparatus 200 may directly produce the one-time password using the unique identification information included in the biometric information for authentication. Alternatively, the unique identification information may be transferred to the OTP server 300 to produce a one-time password, which in turn is transmitted to the biometric information authenticating apparatus 200. Details of the biometric information authenticating apparatus 200 will be described with reference to FIG. 3 below.

The OTP server 300 receives the unique identification information, which is included in the biometric information for authentication, along with a request message for the one-time password from the biometric information authenticating apparatus 200, carries out an algorithm which uses a secret key corresponding to the unique identification information and a current time value as a seed value to produce the one-time password, and then sends the one-time password to the biometric information authenticating apparatus 200. The OTP server 300 produces the one-time password using the same secret key as used to produce the one-time password by the biometric information creating apparatus 100. Further, the biometric information creating apparatus 100 and the OTP server 300 utilize a predetermined range of time values rather than an instant time value when producing the one-time password. Accordingly, the success or failure of the authentication is not affected by the time difference that is necessarily incurred from the time when the biometric information creating apparatus 100 produces the biometric information to the time when the biometric information authenticating apparatus 200 authenticates the biometric information.

The computing device 10 serves to as a relay unit that transfers the biometric information for authentication produced from the biometric information creating apparatus 100 to the biometric information authenticating apparatus 200 via the communication network 20. By way of example, in the case where the biometric information creating apparatus 100 is configured to transfer directly the biometric information for authentication to the biometric information authenticating apparatus 200, the biometric information creating and authentication system may be implemented without the computing device 10.

Figure 2:
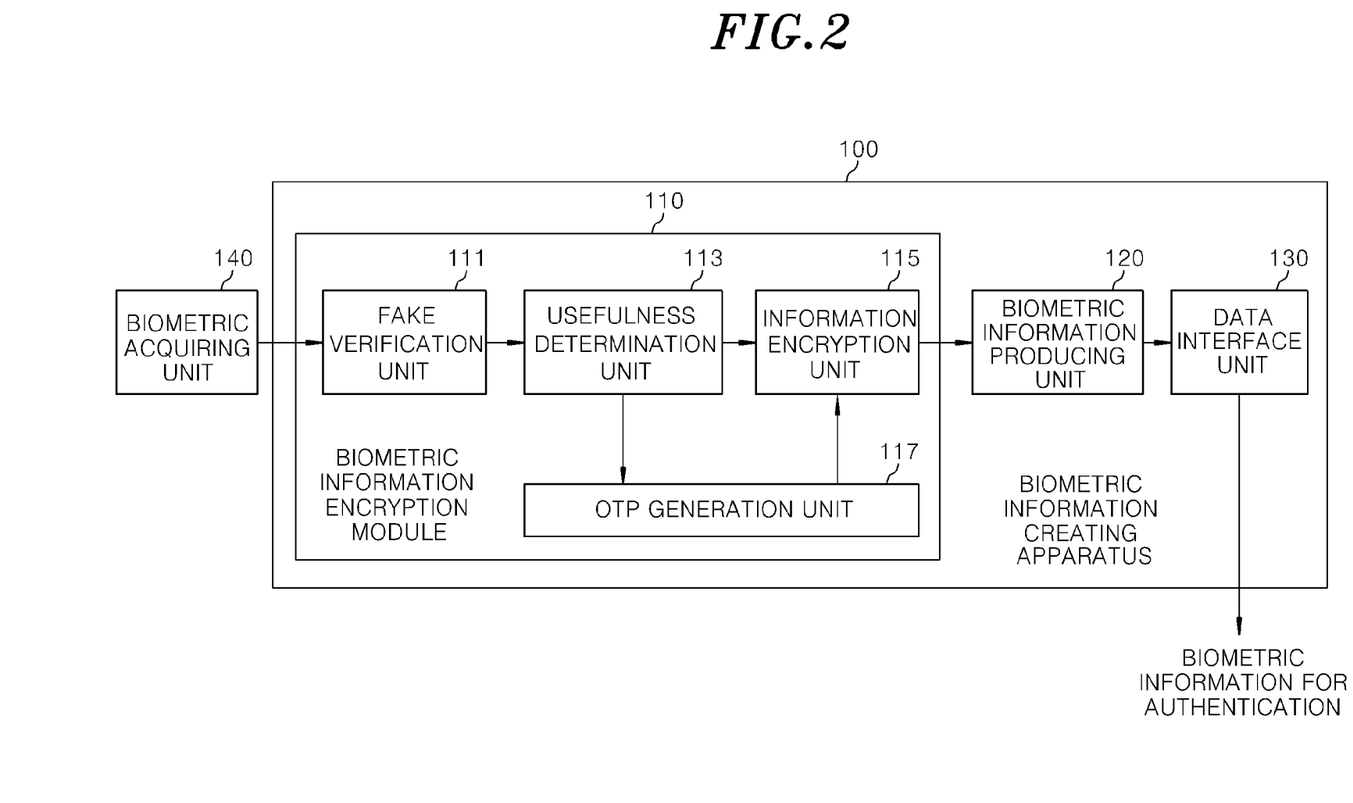
FIG. 2 is a block diagram of a biometric information creating apparatus in accordance with an embodiment of the present invention.

FIG. 2 is a block diagram of the biometric information creating apparatus in accordance with an embodiment of the present invention;

As illustrated in the drawing, the biometric information creating apparatus 100 includes a biometric information encryption module 110, an authentication information producing unit 120 and a data interface unit 130.

Referring to FIGS. 1 and 2, the biometric information encryption module 110 encrypts biometric image information using a one-time password that is available for a predetermined time and creates one-time biometric information that can be decrypted using the one-time password within the predetermined time. As such, the biometric image information, which is encrypted by the biometric information encryption module 110, is provided by a biometric image acquiring unit 140 which acquires a biometric image of a user such as a fingerprint image, face image, and the like. As illustrated in FIG. 2, the biometric image acquiring unit 140 may be disposed independently of the biometric information creating apparatus 100. Alternatively, the biometric image acquiring unit 140 may be included in the biometric information creating apparatus the optical fingerprint recognition apparatus 100, as one body, along with the biometric information encryption module 110, the authentication information producing unit 120 and the data interface unit 130.

The biometric information encryption module 110 includes a fake verification unit 111, a usefulness determination unit 113, an information encryption unit 115, and an OTP generation unit 117.

The fake verification unit 111 verifies whether the biometric image information, which is provided from the biometric image acquiring unit 140, is faked or falsified. That is to say, the fake verification unit 111 verifies whether the biometric information under consideration that is inputted at present is faked or falsified on the basis of the feature difference between the biometric image information acquired realistically in real time by the biometric acquiring unit 140 and image information derived from an image acquired in advance such as a picture or the like.

The usefulness determination unit 113 determines whether the biometric image information that is verified as not being faked or falsified has usefulness enough to use in authentication. By way of example, the usefulness determination unit 113 may determine that the biometric image information has the usefulness if feature information can be extracted therefrom. Alternatively, the usefulness determination unit 113 may extract the feature information from the biometric image information and then provide the same to the information encryption unit 115 so that the usefulness can be determined.

The OTP generation unit 117 generates the one-time password that is available for the predetermined time through an algorithm which uses the current time value and a unique secret key as a seed value. The generated one-time password is provided to the information encryption unit 115. The OTP generation unit 117 utilize a predetermined range of time values rather than an instant time value when producing the one-time password.

The information encryption unit 115 encrypts the biometric image information that is determined as being useful by the use of the one-time password, which is generated by the one-time password generation unit 117, and outputs the one-time biometric information that can be decrypted using the one-time password within the predetermined time. Alternatively, in the case where the usefulness determination unit 113 is configured to provide the feature information about the biometric image information to the information encryption unit 115, the information encryption unit 115 may output one-time biometric information in which the feature information is encrypted.

The authentication information producing unit 120 produces and outputs the biometric information for authentication that includes the one-time biometric information, which is encrypted, from the information encryption unit 110 and the unique identification information for decryption. Alternatively, in the case where the information encryption unit 115 is configured to provide the one-time biometric information within which the feature information is encrypted to the authentication information producing unit 120, the authentication information producing unit 120 may process the biometric information for authentication in the template form with a particular format. In this case, the biometric information for authentication may include header information and template data.

The data interface unit 130 serves to provide an interface to output the biometric information for authentication produced by the authentication information producing unit 120 in order for authentication of the biometric information. That is to say, the data interface unit 130 defines an interface for transferring the biometric information for authentication to either the biometric information authenticating apparatus 200 or the OTP server 300. For example, the data interface unit 130 may include a serial communication interface such as RS-232/485, USB (Universal Serial Bus), SPI (Serial Peripheral Interface), etc. and a wireless channel for Bluetooth communication, Wi-Fi communication, or the others.

Figure 3:
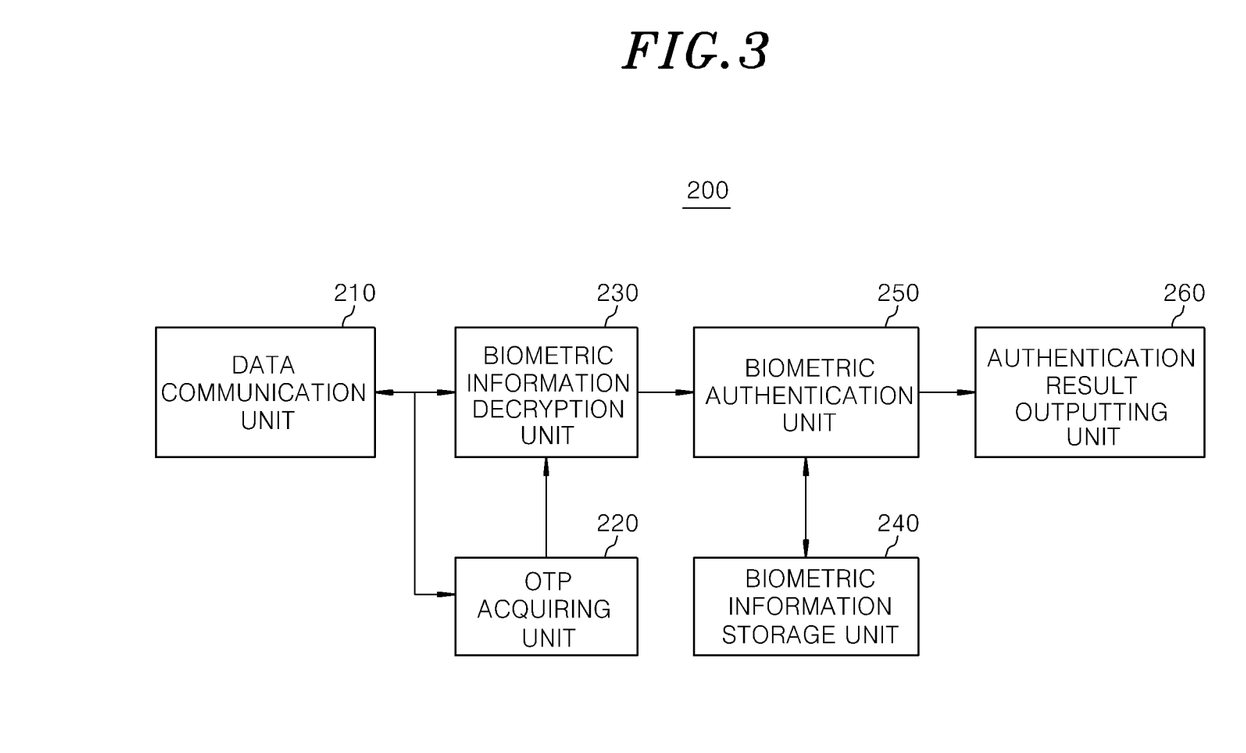
FIG. 3 is a block diagram of a biometric information authenticating apparatus in accordance with an embodiment of the present invention.

FIG. 3 is a block diagram of a biometric information authenticating apparatus for authenticating biometric information in accordance with an embodiment of the present invention.

The biometric information authenticating apparatus 200 includes a data communication unit 210, an OTP acquiring unit 220, a biometric information decryption unit 230, a biometric information storage unit 240, a biometric authentication unit 250, and an authentication result output unit 260.

Referring to FIGS. 1 to 3, the data communication unit 210 receives the biometric information for authentication including the one-time biometric information that can be decrypted using the one-time password available for a predetermined time.

The OTP acquiring unit 220 acquires the one-time password that was used during the encryption process by using the unique identification information included in the biometric information for authentication. For example, the OTP acquiring unit 220 may produce the one-time password through the algorithm which utilizes the secret key corresponding to the unique identification information included in the biometric information for authentication and a current time as a seed value.

The biometric information decryption unit 230 decrypts the one-time biometric information using the one-time password to extract the biometric image information.

The biometric information storage unit 240 serves to store the reference biometric information to be used in biometric authentication procedure.

The biometric authentication unit 250 authenticates the biometric image information based on the comparison result of the biometric image information and the reference biometric information. By way of example, the biometric authentication unit 250 may process the feature information extracted from the biometric image information in the template form with a particular format to produce the biometric information template and compares the biometric information template with the reference biometric information before performing the authentication processing in accordance with the comparison result.

The authentication result output unit 260 outputs the result of the authentication processing conducted by the biometric authentication unit 250.

The OTP acquiring unit 220 in the aforementioned biometric information authenticating apparatus 200 may send the unique identification information to the OTP server 300 on which the algorithm for the generation of the one-time password is installed and then receive the one-time password, which will be used for decrypting the one-time biometric information, from the OTP server 300. As such, both sending the unique identification information and receiving the one-time password may be implemented through the data communication unit 210.

Figure 4:
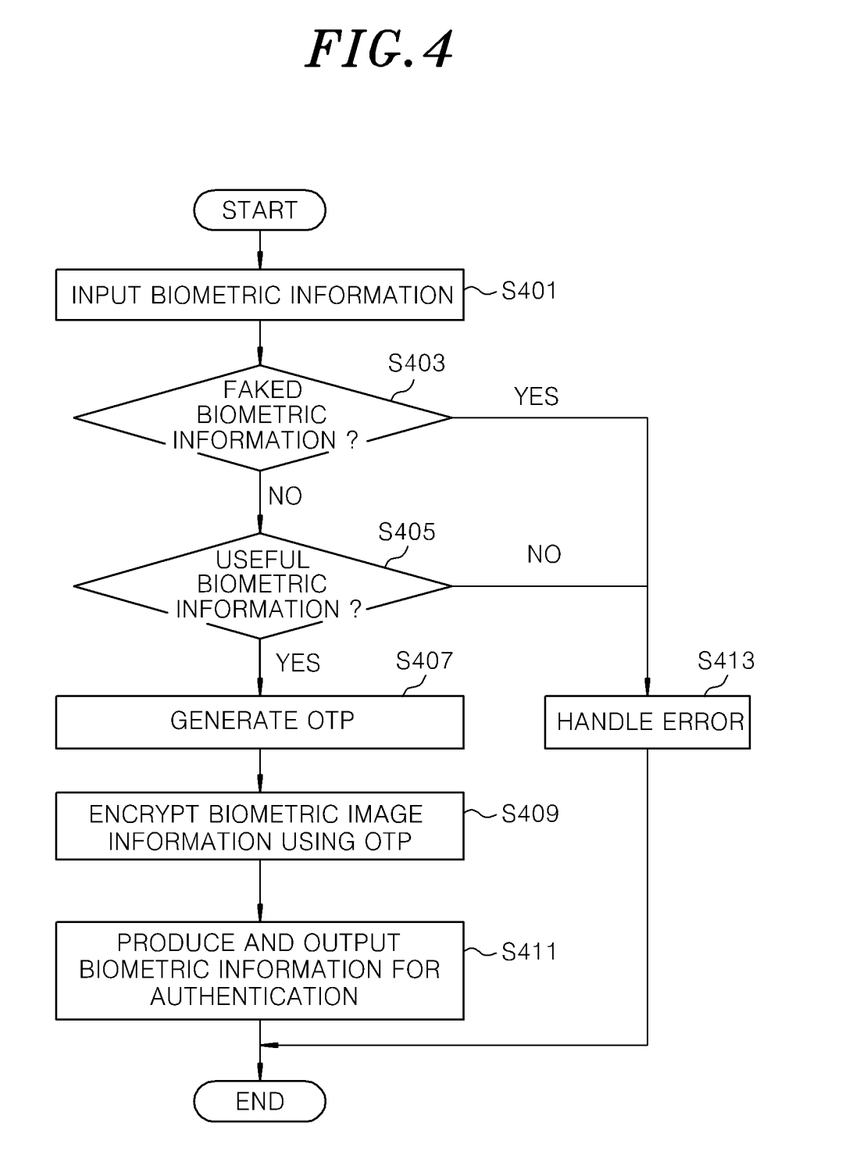
FIG. 4 is a flowchart illustrating a method for creating biometric information in accordance with an embodiment of the present invention.

FIG. 4 is a flowchart illustrating a method for creating the biometric information in accordance with an embodiment of the present invention.

As illustrated in the drawing, a biometric information creating method of the embodiment generally includes: verifying whether the biometric image information is faked or falsified at block S401 and block S403; and determining whether the biometric image information that is verified as not being faked or falsified has a usefulness enough to use in the authentication process at block S405.

The method also includes, at block S407, generating the one-time password that is available for a predetermined time.

Further, the method includes, at block S409, encrypting the biometric image information using the one-time password to create the one-time biometric information that can be decrypted using the one-time password within the predetermined time. For example, when creating the one-time biometric information, the one-time biometric information may be created by encrypting the feature information extracted from the biometric image information.

Further, the method includes, at block S411, producing and outputting the biometric information for authentication in which the unique identification information is included. For example, the biometric information for authentication may be produced by processing the biometric information for authentication in the template format with a particular form.

In addition, the method further includes, at block S413, handling error on the biometric image information that is faked or falsified or cannot be used for the authentication.

Figure 5:
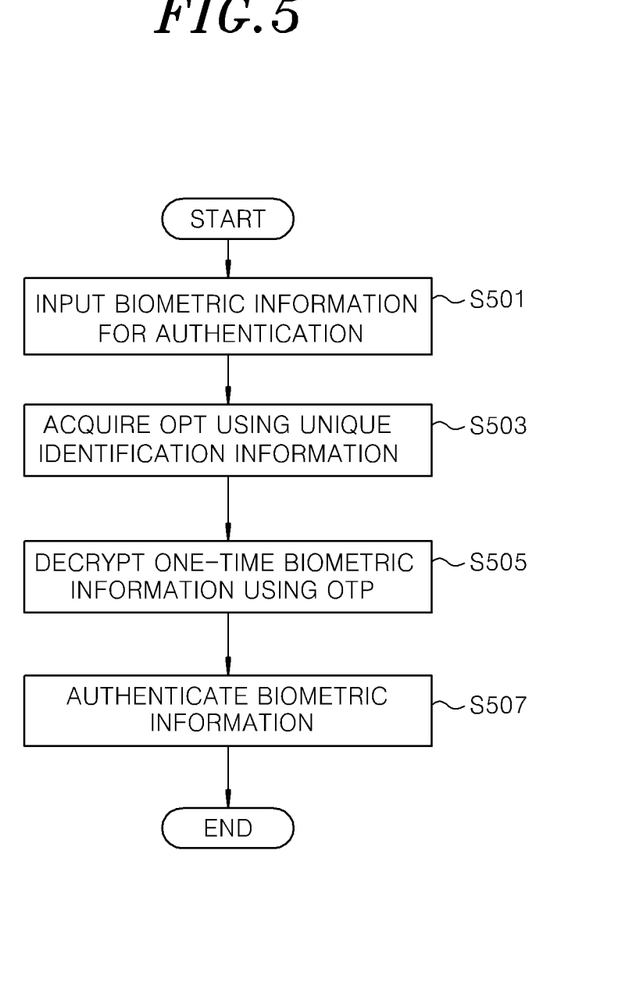
FIG. 5 is a flowchart illustrating a method for authenticating biometric information in accordance with an embodiment of the present invention.

FIG. 5 is a flowchart illustrating a method for authenticating the biometric information in accordance with an embodiment of the present invention.

As illustrated in the drawing, a biometric information authenticating method generally includes: receiving the biometric information for authentication including the one-time biometric information that can be decrypted using the one-time password that is available for the predetermined time at block S501; and acquiring the one-time password that was employed during the encryption process using the unique identification information included the biometric information for authentication at block S503.

The method also includes decrypting the one-time biometric information using the one-time password to extract the biometric image information.

Further, the method includes outputting the result of the authentication processing based on the comparison between the biometric image information and the predetermined reference biometric information at block S507. For example, the authentication processing may be carried out by processing the feature information extracted from the biometric image information in the template form with a particular format to produce the biometric information template and comparing the biometric information template with the reference biometric information.

Hereinafter, the biometric information creating method and the biometric information authenticating method will be described in detail with reference to FIGS. 1 to 5 below.

First, the biometric image acquiring unit 140, which may be included in the biometric information creating apparatus 100 in a body or arranged independently of the biometric information creating apparatus 100, acquires the biometric image information such as a fingerprint image or face image, or a finger vein image of a user and provides it to the fake verification unit 111 of the biometric information encryption module 110 at block S401.

Next, the fake verification unit 111 verifies whether the biometric image information provided from the biometric image acquiring unit 140 is faked or falsified. For example, the fake verification unit 111 verifies whether the biometric image information that is inputted to the optical fingerprint recognition apparatus 100 at present is faked or falsified on the basis of the feature difference between the biometric image information acquired realistically in real time by the biometric acquiring unit 140 and the image information derived from an image secured in advance such as a picture or the like. If the biometric image information is verified as not being faked or falsified, the biometric image information, i.e., that is verified that it is not a faked biometric information is provided to the usefulness determination unit 113. For example, in the case where the biometric image information provided from the biometric image acquiring unit 140 is any one of the fingerprint or the finger vein, the verification of authenticity can be carried out through an LFD (Live Finger Detection). For a face image, the verification of authenticity may be carried out through an FLD (Face Liveness Detection) at block S403.

The usefulness determination unit 113 determines whether the biometric image information, which is verified as not being faked or falsified by the fake verification unit 111, has a usefulness enough to use in authentication at block S405. If it is determined that the biometric image information is useful, the biometric image information is provided to the information encryption unit 115. In this regard, the usefulness determination unit 113 may provide the information encryption unit 115 with the feature information that is extracted from the biometric image information. For example, in the case where the biometric image information is a fingerprint image, feature points such as ridges, break points and branch points are extracted from the fingerprint image and location relationship such as distance or angle between the feature points may be selected as the feature information.

The one-time password generation unit 117 of the biometric information encryption module 110 generates the one-time password that is available for the predetermined time through the algorithm which uses the current time value and the unique secret key as the seed value and provides the one-time password to the information encryption unit 115 of the information encryption unit 110. The one-time password generation unit 117 uses a predetermined range of time values rather than an instant time value when producing the one-time password at block S407.

After that, the information encryption unit 115 encrypts the biometric image information using the one-time password, which is generated by the one-time password generation unit 117, and outputs the one-time biometric information that can be decrypted using the one-time password within the predetermined time at block S409. For example, if the usefulness determination unit 113 provides the feature information of the biometric image information to the information encryption unit 115, the information encryption unit 115 may output the one-time biometric information in which the feature information is encrypted.

Subsequently, the authentication information producing unit 120 produces and outputs the biometric information for authentication that includes the one-time biometric information, which is encrypted, from the information encryption unit 110 and the unique identification information for decryption at block S411. For example, if the information encryption unit 115 provides the one-time biometric information within which the feature information is encrypted to the authentication information producing unit 120, the authentication information producing unit 120 may process the biometric information for authentication in the template form with a particular format, wherein the biometric information for authentication may include header information and template data.

In this regard, the unique identification information is used when the biometric information authenticating apparatus 200 identifies by which user or by which device the biometric information was encrypted at the time of decryption of the biometric information later.

The biometric information for authentication that is generated from the authentication information producing unit 120 is transferred to the computing device 10 through the interface presented by the data interface 130 over a wired communication channel or wireless communication channel.

The computing device 10 then relays the biometric information for authentication to the biometric information authenticating apparatus 200 that is connected via the communication network 20.

However, if it is determined, at block S403, that the biometric image information provided from the biometric image acquiring unit 140 is a faked or falsified one, that is, a faked biometric information, the fake verification unit 111 handles an error and then terminates the biometric information creating method in block S403. Also, if the useful biometric information cannot be extracted from the biometric image information, the method goes to block S413 where the usefulness determination unit 113 handles an error and then terminates the biometric information creating method.

Next, in block S501, the data communication unit 210 of the biometric information authentication unit 200 receives from the computing device 10 the biometric information for authentication which includes the one-time biometric information that can be decrypted using the one-time password that is available for the predetermined time.

Thereafter, at block S03, the OTP acquiring unit 220 of the biometric information authenticating apparatus 200 acquires the one-time password that was used in the encryption process using the unique identification information included in the biometric information for authentication. The OTP acquiring unit 220 produces the one-time password through the algorithm that utilizes the secret key corresponding to the unique identification information and the current time value as the seed value.

In this regard, the OTP acquiring unit 220 or the OTP server 300 produces the one-time password through the algorithm that utilizes the secret key corresponding to the unique identification information, which is included in the biometric information for authentication, and the current time value as the seed value, when producing the one-time password. In this case, the one-time password may be produced by the use of a predetermined range of time values rather than an instant time value when producing the one-time password. Accordingly, the success or failure of the authentication is not affected by the time difference that is necessarily incurred from the time when the biometric information creating apparatus 100 produces the biometric information to the time when the biometric information authenticating apparatus 200 authenticates the biometric information. That is to say, for the predetermined time during which the one-time password is available, the same one-time password is produced or acquired in both block S407 and block S503.

Thereafter, the biometric information decryption unit 230 decrypts the one-time biometric information using the one-time password to extract the biometric image information for outputting thereof at block S505.

The biometric authentication unit 250 then performs the authentication processing on the biometric image information based on the comparison result of the biometric image information, which is extracted from the biometric information decryption unit 230, and the reference biometric information, which is pre-stored in the biometric information storage unit 240. As an example, the biometric authentication unit 250 may process the feature information extracted from the biometric image information in the template form with a particular format to produce the biometric information template and compare the biometric information template with the reference biometric information before performing the authentication processing in accordance with the comparison result. When the similarity between the decrypted biometric feature information and the pre-stored reference biometric information meets a predetermined criterion, the biometric information creating apparatus 100 authenticates the user from whom the biometric information is acquired as a normal user, at block S507.

The result of the biometric authentication processing conducted by the biometric authentication unit 250 is outputted exterior through the authentication result output unit 260. For example, the result of the biometric authentication processing may be outputted in the form of audio or video mode, or may be provided to a remote location through a preset communication channel.

As set forth above, according to the embodiments, the biometric information for authentication created for the biometric authentication is available for a predetermined time after it was acquired. Further, the authentication processing is carried out on the biometric information useful for the predetermined time after the biometric information was acquired when it is authenticated. Therefore, the authentication processing can be normally performed on only the biometric information that is acquired immediately when it is necessary for financial transactions or individual authentication.

Further, the biometric image information for biometric authentication is encrypted immediately after it was acquired and can be decrypted only for a predetermined time. Therefore, even if the relevant biometric information is leaked, the leaked biometric information will be useless information which cannot pass the biometric authentication when the predetermined time has lapsed.

Consequently, the biometric data cannot be changed even if a biometric authentication equipment that creates biometric information for authentication is modified by its manufacturer, as well as a personal computer or a mobile device is modified in its software or application that transmits biometric information for authentication.

The combinations of the each block of the block diagram and each operation of the flow chart may be derived from computer program instructions. Because the computer program instructions may be loaded on a general purpose computer, a special purpose computer, or a processor of programmable data processing equipment, the instructions performed through the computer or the processor of the programmable data processing equipment may generate the means performing functions described in the each block of the block diagram and each operation of the flow chart. Because the computer program instructions may be stored in computer readable memory or a memory usable in a computer which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions derived from the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

The explanation as set forth above is merely described a technical idea of the exemplary embodiments of the present invention, and it will be understood by those skilled in the art to which this invention belongs that various changes and modifications may be made without departing from the scope of the essential characteristics of the embodiments of the present invention. Therefore, the exemplary embodiments disclosed herein are not used to limit the technical idea of the present invention, but to explain the present invention, and the scope of the technical idea of the present invention is not limited to these embodiments. Therefore, the scope of protection of the present invention should be construed as defined in the following claims and changes, modifications and equivalents that fall within the technical idea of the present invention are intended to be embraced by the scope of the claims of the present invention.

What is claimed is:

1. An apparatus for creating biometric information, the apparatus comprising:
    a biometric information encryption module configured to encrypt biometric image information using a one-time password that is available for a predetermined time to create one-time biometric information that can be decrypted using the one-time password within the predetermined time;
    an authentication information producing unit configured to produce biometric information for authentication in which the one-time biometric information and unique identification information for the decryption are included; and
    a data interface unit configured to present an interface through which the biometric information for authentication is outputted in order to carry out an authentication procedure.

2. The apparatus of claim 1, wherein the biometric information encryption module is configured to encrypt feature information that is extracted from the biometric image information to create the one-time biometric information, and
    wherein the authentication information producing unit is configured to process the biometric information for authentication into a template form with a particular format.

3. The apparatus of claim 1, wherein the biometric information encryption module is configured to generate the one-time password through an algorithm that utilizes a current time value and a unique secret key as a seed value.

4. The apparatus of claim 1, wherein the biometric information encryption module is configured to verify whether the biometric image information is faked or falsified and determines whether the biometric image information has a usefulness enough to use in the authentication before carrying out the encryption.

5. A method for creating biometric information, the method comprising:
    generating a one-time password that is available for a predetermined time;
    creating one-time biometric information by encrypting biometric image information using the one-time password, wherein the one-time biometric information can be decrypted using the one-time password within the predetermined time; and
    producing biometric information for authentication in which the one-time biometric information and unique identification information for the decryption are included to output the same.

6. The method of claim 5, wherein said creating the one-time biometric information comprises encrypting feature information that is extracted from the biometric image information to thereby create the one-time biometric information, and wherein said producing biometric information for authentication comprises processing the biometric information for authentication into a template form with a particular format.

7. The method of claim 5, wherein the one-time password is generated through an algorithm that utilizes a current time value and a unique secret key as a seed value.

8. The method of claim 5, wherein said creating one-time biometric information comprises verifying whether the biometric image information is faked or falsified and determining whether the biometric image information has a usefulness enough to use in the authentication before carrying out the encryption.

9. An apparatus for authenticating biometric information, the apparatus comprising:
   a data communication unit configured to receive biometric information for authentication including a one-time biometric information that can be decrypted by using a one-time password that is available for a predetermined time;
   an OTP (one-time password) acquiring unit configured to acquire the one-time password employed during an encryption process using unique identification information which is included in the biometric information for authentication;
   a biometric information decryption unit configured to decrypt the one-time biometric information using the one-time password to extract biometric image information;
   a biometric information storage unit that stores a reference biometric information to be utilized in an authentication procedure;
   a biometric authentication unit configured to authenticate the biometric image information based on the result of comparison between the biometric image information and the reference biometric information; and
   an authentication result output unit configured to output the result that is authenticated by the biometric authentication unit.

10. The apparatus of claim 9, wherein the biometric authentication unit is configured to process feature information that is extracted from the biometric image information in a template form with a particular format to produce a biometric information template before authenticating the biometric image information based on the result of a comparison between the biometric image information and the reference biometric information.

11. The apparatus of claim 9, wherein the one-time password is generated by an algorithm that utilizes a secret key corresponding to the unique identification information and a current time value as a seed value.

12. The apparatus of claim 11, wherein the OTP acquiring unit is further configured to send the unique identification information to a one-time password server on which the algorithm is installed to generate the one-time password and then receive the one-time password from the one-time password server.

13. A method for authenticating biometric information, the method comprising:
   receiving biometric information for authentication including one-time biometric information that can be decrypted by using a one-time password that is available for a predetermined time;
   acquiring the one-time password employed during an encryption process using unique identification information that is included in the biometric information for authentication;
   decrypting the one-time biometric information using the one-time password to extract biometric image information; and
   outputting the result that authenticates the biometric image information based on the result of a comparison between the biometric image information and predetermined reference biometric information.

14. The method of claim 13, wherein said outputting the result that authenticates the biometric image information comprises processing feature information that is extracted from the biometric image information in a template form with a particular format to produce a biometric information template before authenticating the biometric image information based on the result of a comparison between the biometric image information and the reference biometric information.

15. The method of claim 13, wherein the one-time password is generated by an algorithm that utilizes a secret key corresponding to the unique identification information and a current time value as a seed value.

16. The method of claim 15, wherein said acquiring the one-time password further comprises sending the unique identification information to a one-time password server on which the algorithm is installed to produce the one-time password and receiving the one-time password from the one-time password server.

17. A system for creating and authenticating biometric information, the system comprises:
   a biometric information creating apparatus configured to: encrypt biometric image information using a one-time password that is available for a predetermined time to create one-time biometric information that can be decrypted using the one-time password within the predetermined time; and output biometric information for authentication in which the one-time password and unique identification information for the decryption; and
   a biometric information authenticating apparatus configured to: acquire the one-time password employed during an encryption process using the unique identification information that is included in the biometric information for authentication; decrypt the one-time biometric information using the one-time password to extract biometric image information; and output the result that authenticates the biometric image information based on the result of a comparison between the biometric image information and the reference biometric information.

* * * * *